US012674438B2

(12) United States Patent
Álvarez et al.

(10) Patent No.: US 12,674,438 B2
(45) Date of Patent: Jul. 7, 2026

(54) METHOD FOR REPAIRING A WIND TURBINE ROTOR BLADE AND WIND TURBINE ROTOR BLADE

(71) Applicants:Nordex Energy SE & Co. KG, Hamburg (DE); Nordex Energy Spain S.A.U., Barásoain (ES)

(72) Inventors: Ixone Bengoetxea Álvarez, Barasoain (ES); Osane Casas Prado, Barasoain (ES); Itziar Castresana Herrera, Barasoain (ES); Oscar Lois Vidal, Barasoain (ES); Bruno Gambale, Barasoain (ES); Iosu Garcia Aguerri, Barasoain (ES); Felix Hahn, Hamburg (DE)

(73) Assignees: Nordex Energy SE & Co. KG, Hamburg (DE); Nordex Energy Spain S.A.U., Barasoain (ES)

( * ) Notice: Subject to any disclaimer, the term of this patent is extended or adjusted under 35 U.S.C. 154(b) by 43 days.

(21) Appl. No.: 19/049,963

(22) Filed: Feb. 10, 2025

(65) Prior Publication Data

US 2025/0264088 A1     Aug. 21, 2025

(30) Foreign Application Priority Data

Feb. 15, 2024     (EP) ..................................... 24382145

(51) Int. Cl.
*F03D 80/50* (2016.01)
*F03D 1/06* (2006.01)
(52) U.S. Cl.
CPC ......... *F03D 80/502* (2023.08); *F03D 1/0675* (2013.01); *F05B 2230/80* (2013.01); *F05B 2260/301* (2013.01); *F05B 2280/6003* (2013.01)

(58) Field of Classification Search
CPC .... F03D 1/0675; F03D 1/0677; F03D 1/0679; F03D 1/0681; F03D 1/0682;
(Continued)

(56) References Cited

U.S. PATENT DOCUMENTS 4,512,752 A     4/1985   Brenneman
6,820,334 B2 *  11/2004  Kebbede ................. B23P 6/005
                                              29/889.1
(Continued)

FOREIGN PATENT DOCUMENTS

CN     112814156 A     5/2021
CN     112814157 A     5/2021
EP     4 052 891 A1    9/2022

OTHER PUBLICATIONS

Cao, Z. et al., "Formation mechanism and detection and evaluation methods as well as repair technology of crack damage in fiber-reinforced composite wind turbine blade: a review", The International Journal of Advanced Manufacturing Technology (2022), 120, Springer, pp. 5649 to 5672.
(Continued)

*Primary Examiner* — Nathaniel E Wiehe
*Assistant Examiner* — Jason G Davis
(74) *Attorney, Agent, or Firm* — Walter Ottesen, P.A.

(57) ABSTRACT

A method is for repairing a wind turbine rotor blade. The rotor blade includes a component made of a fiber reinforced laminate, wherein the component has a defect. The method includes: providing a repair kit for bridging the defect, the repair kit having a first flange piece, a second flange piece, and a connecting bolt, wherein each flange piece has a mounting portion and a connecting portion; bonding the first flange piece with its mounting portion onto a first surface region of the component and the second flange piece with its mounting portion onto a second surface region of the component such that each flange piece is arranged at a
(Continued)

predefined distance from the defect and the defect runs between the two flange pieces, and screwing the first flange piece and the second flange piece together at their connecting portions via the connecting bolt to bridge the defect.

18 Claims, 7 Drawing Sheets

(58) Field of Classification Search
CPC ...... F03D 1/0684; F03D 80/50; F03D 80/502; F05B 2230/80; F05B 2260/301; F05B 2280/6003
See application file for complete search history.

(56) References Cited

U.S. PATENT DOCUMENTS

| | | | | |
|---|---|---|---|---|
| 7,306,692 | B2 * | 12/2007 | Graham .................. | B29C 73/32 |
| | | | | 156/304.3 |
| 11,312,507 | B2 * | 4/2022 | Cheng ....................... | B64C 1/12 |
| 11,466,661 | B2 * | 10/2022 | Warzok ................ | F03D 1/0675 |

OTHER PUBLICATIONS

Extended European search report of the European Patent Office dated Jul. 22, 2024 in European patent application No. 24382145.1 on which the claim of priority is based.

* cited by examiner

<u>Fig. 2</u>
<u>Fig. 3</u>
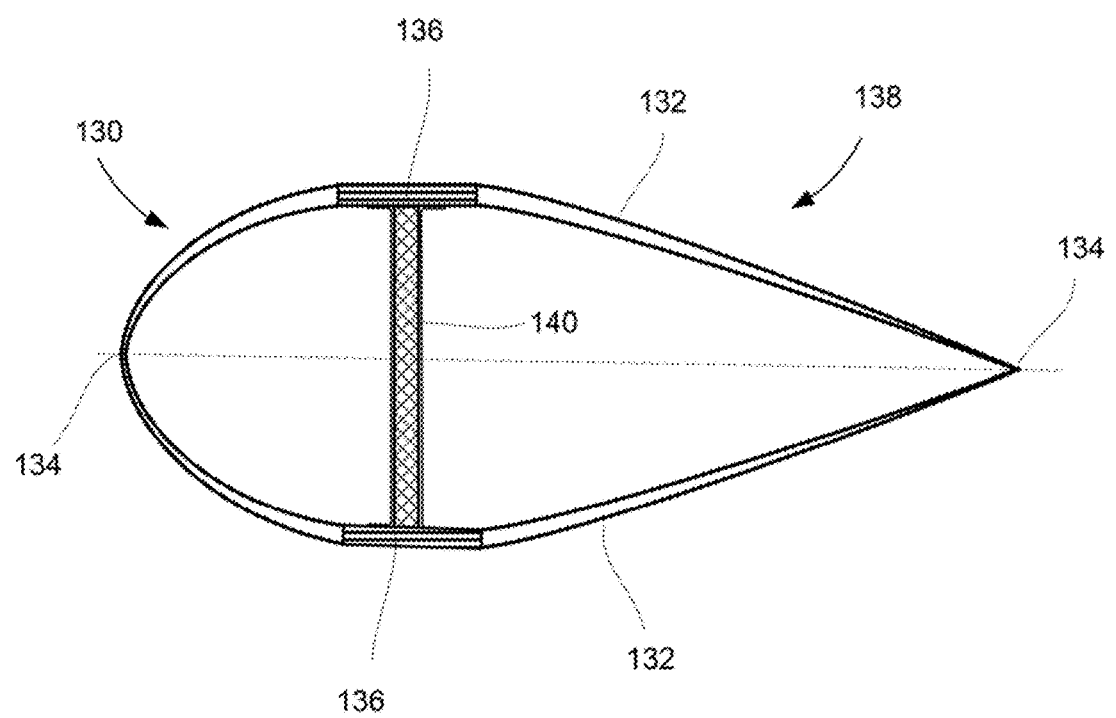

METHOD FOR REPAIRING A WIND TURBINE ROTOR BLADE AND WIND TURBINE ROTOR BLADE

CROSS-REFERENCE TO RELATED APPLICATIONS

This application claims priority of European patent application no. 24382145.1, filed Feb. 15, 2024, the entire content of which is incorporated herein by reference.

TECHNICAL FIELD

The disclosure concerns a method for repairing a wind turbine rotor blade, the wind turbine rotor blade including a component made of a fiber reinforced laminate. The disclosure also addresses a wind turbine rotor blade.

BACKGROUND

Wind turbines with wind turbine rotor blades are widely known from the state of the art and are used to convert wind energy into electrical energy. Wind turbine rotor blades are usually manufactured in a shell configuration and include several components made of fiber reinforced laminate, such as an aerodynamic shell. Typically, two half-shells are produced which, after curing, are assembled and joined together in their half-shell molds to form the entire aerodynamic shell. The half-shells, which themselves may be segmented for manufacturing a so-called split-blade or segmented blade, are placed on top of each other after their respective manufacture and bonded together to produce the rotor blade. The half-shells may be interconnected inside the rotor blade by one or more (shear) webs or spars running in the longitudinal direction of the rotor blade, which absorb forces between the half-shells, especially during operation, and thus stabilize the aerodynamic shape of the rotor blade during operation.

The fiber composite components of a wind turbine rotor blade, for example, the shell structure can wear out and suffer from damage, wherein, for example, a crack can be formed which mechanically weakens the component. This can have severe consequences for the wind turbine rotor blade, up to and including complete breakdown.

SUMMARY

It is an object of the disclosure to provide a concept to reliably and efficiently repair such a finding on a component of a wind turbine rotor blade.

This object is solved by various embodiments of the disclosure.

According to a first aspect, a method for repairing a wind turbine rotor blade is disclosed. The wind turbine rotor blade includes a component made of a fiber reinforced laminate (also: fiber composite component), wherein the component includes a defect. The method includes the steps of:

providing a repair kit for bridging the defect, the kit having a first flange piece, a second flange piece, and a connecting bolt, wherein each flange piece has a mounting portion and a connecting portion;

bonding the first flange piece with its mounting portion onto a respective first surface region of the component and the second flange piece with its mounting portion onto a second surface region of the component such that each flange piece is arranged at a predefined distance from the defect and the defect runs between the two flange pieces, and screwing the first flange piece and the second flange piece together at their connecting portions via the connecting bolt to bridge the defect.

Conventionally, that is, with a standard repair approach, laminate layers and typically core material of the defective component would be removed and replaced with new repair material, that is, new laminate layers and new core material. Such a conventional approach would include a lot of manual work, for example, removal of affected material and layup of repair laminate layers by hand, and typically takes about two to five working shifts. The wind turbine has to be shut down during the repair time.

The inventive method described herein enables a quick, easy and secure repair of such a defect of a fiber composite component. The method features the use of the repair kit, which includes prefabricated parts, that is, the flange pieces and the connecting bolt. The flange pieces are bonded next to the defect and connected mechanically via the connecting bolt. The defect is located in between the flange pieces, that is, the flange pieces do not cover the defect. The connecting bolt extends over the defect and runs transverse to the defect. By the repair kit, in the bonded state, a flow of force goes through the flange pieces and the connecting bolt to bridge the defect, that is, no or only little force runs through the defect. Thus, a load by-pass is established. In other words, in the installed and/or operated state of the wind turbine, at least an essential portion of a load which would act on the defect (and would cause a defect growth) would be compensated for through the repair kit. This results in less or hardly any load on the component in the damaged region and in the defect being structurally bridged. Thus, the defective component is fully functional again, or further degeneration is at least stopped or reduced, that is, crack growth. Finally, the combination with a preloaded (pretensioned) bolt would enhance the described effects even further (see below).

The inventive method has the following advantages.

The time needed for the repair process can be drastically reduced, in particular to one shift (instead of two to five shifts as explained above).

The repair process is a very simple process. For example, less experienced technicians can repair a defect with sufficiently good quality.

The prefabricated parts ensure a constant quality.

Short-term application is possible to cover a defect of the component by the pre-fabricated parts.

Repair costs are reduced drastically, in particular due to the decrease of working hours.

Cost for liquidated damages can be reduced.

The defect means a structural defect, for example, a delamination, a crack or combinations thereof. A defect which is not repaired could lead to a complete failure, for example, break of the blade. As an example, transversal delaminations and cracks that need to be repaired typically occur in the shell of the turbine rotor blade, for example, inside the rotor blade on the pressure or suction side shell towards the trailing edge.

The defect extends mainly along a defect extension direction. However, the defect, for example, the crack, does not necessarily run fully linearly. The defect runs between the two flange pieces, meaning that the defect extension direction is essentially traverse to a longitudinal direction of the bolt.

The component made of a fiber reinforced laminate is for example a shell of the wind turbine rotor blade.

The repair kit, as mentioned, includes prefabricated parts. The flange pieces and the connecting bolt are preferably made from metal. This ensures high and precise manufacturing quality, high stability and good load transfer to bridge the defect. The flange pieces can also be named as fittings or metallic fittings.

A mounting portion is preferably a surface of the respective flange piece with which the flange piece is bonded to the component. In other words, the mounting portion defines an area which is configured for joining the flange piece to the component.

According to an embodiment, several repair kits are provided and installed next to each other on the component, in particular depending on the size and harmful impact of the defect.

According to an embodiment, the mounting portion is formed by a mounting plate and the connecting portion is formed by a connecting plate. This enables a stable, flat connection of the flange pieces to the component and a stable flange connection between the two flange pieces.

According to an embodiment, both surface regions of the component are pre- treated prior to the step of bonding. For example, the surface regions are cleaned, grinded and/or roughened. Thus, a particularly good, that is, strong, bonding of the mounting plates with the surface of the blade shell is achieved.

According to an embodiment, prior to the step of bonding, adhesive is applied to the mounting portion of the first flange piece and to the mounting portion of the second flange piece to bond them to the respective surface region.

Optionally, the mounting portions of the first and second flange pieces are each covered by a protection element like a peel ply or a foil. The peel ply or the foil is removed prior to the step of bonding. This makes it possible to protect the mounting portions and activate the surfaces shortly before the step of bonding. The mounting portions are provided with adhesive shortly after removal of the peel plies. This ensures a high-quality bonding process.

According to an embodiment, prior to the step of bonding adhesive is applied to both surface regions for bonding the mounting portion of the first flange piece and the mounting portion of the second flange piece to the respective surface region. This ensures a high-quality bonding process wherein, alternatively to the above, the component, and not the flange pieces, is provided with adhesive. However, to improve the bonding process even more, both the surface regions of the component as well as the mounting portions of the cover plates are provided with adhesive.

According to an embodiment, a position of the flange pieces is marked on the component prior to the step of bonding. Thus, the flange pieces can be exactly positioned. This contributes to a very effective bridging of the defect.

According to an embodiment, for marking the position, a stud is fixed on the component for each surface region, wherein the mounting portion of each flange piece has a respective opening or recess to engage the respective stud in a form-fit manner. Thus, the position of each flange piece is predetermined. Preferably, two or more studs are used per surface region to clearly define a position for each flange piece. Additionally, the stud is used for applying pressure to the mounting portion of the respective flange piece during the curing of the adhesive. The stud has an outer thread and a nut is screwed on the stud for applying a pressure force.

According to an embodiment, prior to the step of bonding, a cured fiber composite laminate pad is applied to the mounting portion of each of the two flange pieces, wherein the mounting portion of each flange piece is bonded to the respective surface region via the respective fiber composite laminate pad. This is ideally done in a workshop before shipping the pieces. The advantage is, that bonding composite to composite is much easier than composite to metal. Furthermore, the peel ply on the surface of the fiber composite laminate pad can be simply removed. This is easier to execute than a grinding of the metallic surface before bonding.

According to an embodiment, a rigid spacer element is provided between the connecting portions of the flange pieces to ensure a predetermined distance between the connecting portions of the two flange pieces. The rigid spacer element functions as a central-part or middle-part between the two flange pieces and acts as a distance element for the flange pieces, particularly when the flange pieces are tightly screwed together. In the latter state, the spacer element is clamped between the flange pieces and allows for a pretension of the connecting bolt.

According to an embodiment, in the step of screwing, the rigid spacer element is clamped between the connecting portions of the two flange pieces such that the connecting bolt is pretensioned. We refer to the above description.

According to an embodiment, the thickness of each flange piece including the mounting portion decreases towards at least an edge of the respective mounting portion. Particularly, the thickness of the mounting plates decreases. This contributes to efficient load transitions between the fiber composite component and the flange pieces.

According to an embodiment, after the step of bonding, heat is applied for curing the adhesive. This finishes the bonding process by stably connecting the repair kit to the component.

According to an embodiment, each of the two flange pieces is a metal component or a fiber composite component. We refer to the above description.

According to a second aspect, a repair kit for a wind turbine rotor blade is disclosed. The wind turbine rotor blade includes a component made of a fiber reinforced laminate. The repair kit is configured for bridging a defect located in the component. The repair kit includes a first flange piece and a second flange piece, wherein each flange piece has a mounting portion and a connecting portion. The repair kit includes a connecting bolt. The repair kit is configured for bonding the first flange piece with its mounting portion onto a respective first surface region of the component and bonding the second flange piece with its mounting portion onto a second surface region of the component such that each flange piece is arranged at a predefined distance from the defect and the defect runs between the two flange pieces. The repair is further configured for screwing the first flange piece and the second flange piece together at their connecting portions via the connecting bolt to bridge the defect.

The repair kit enables the above-mentioned functions and advantages. With respect to the first aspect the above-described embodiments analogously apply to the repair kit.

According to a third aspect, a wind turbine rotor blade for a wind turbine is disclosed. The wind turbine rotor blade includes a component made of a fiber reinforced laminate. The wind turbine rotor blade includes a repair kit according to the second aspect. The repair kit is configured for bridging a defect located in the component. The repair kit has a first flange piece, a second flange piece, and a connecting bolt. The first flange piece is bonded with its mounting portion onto a respective first surface region of the component and the second flange is bonded with its mounting portion onto a second surface region of the component such that each flange piece is arranged at a predefined distance from the defect and the defect runs between the two flange pieces. To bridge the defect, the first flange piece and the second flange piece are screwed together at their connecting portions via the connecting bolt.

The wind turbine rotor blade enables the above-mentioned functions and advantages. The above-described embodiments with respect to the first and second aspect analogously apply to the wind turbine rotor blade.

BRIEF DESCRIPTION OF DRAWINGS

The invention will now be described with reference to the drawings wherein:

FIG. 2 shows a schematic view of a rotor blade;

FIG. 3 shows a schematic view of a cross-section of the wind turbine rotor blade;

DETAILED DESCRIPTION

Figure 1:
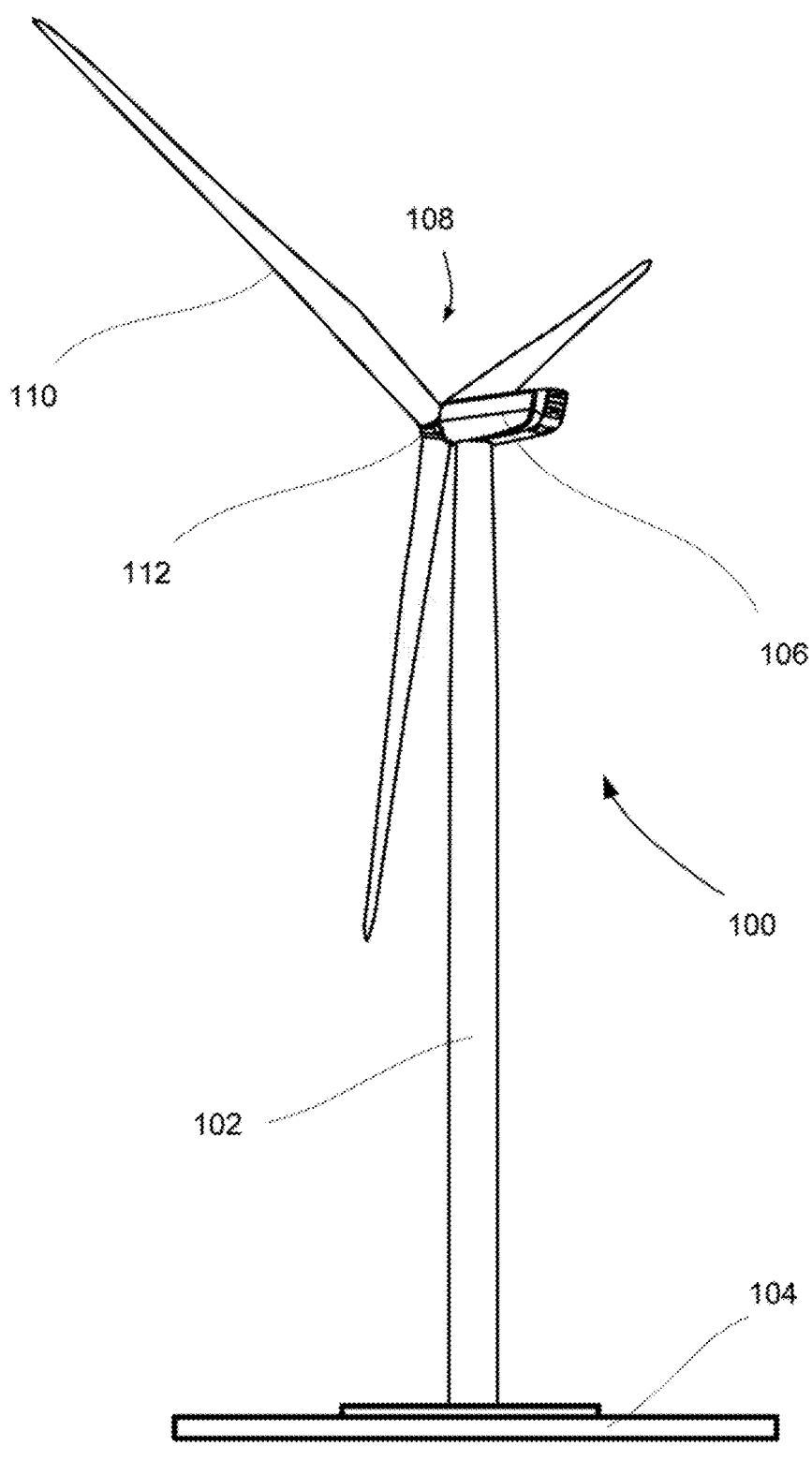
FIG. 1 shows a schematic view of a wind turbine.

FIG. 1 shows a schematic view of a wind turbine 100, which includes a tower 102. The tower 102 is fixed to the ground via a foundation 104. A nacelle 106 is rotatably mounted at one end of the tower 102, opposite to the ground. The nacelle 106, for example, includes a generator which is coupled to a rotor 108 via a rotor shaft (not shown). The rotor 108 includes one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the mechanical energy of the rotor 108 into electrical energy.

FIG. 2 shows a rotor blade 110. The rotor blade 110 has the shape of a conventional rotor blade and has a rotor blade root area 114 facing the rotor hub 112. The rotor blade root area 114 typically has an essentially circular cross-section. The rotor blade root area 114 is followed by a transition area 116 and a profile area 118 of the rotor blade 110. The rotor blade 110 has a pressure side shell 122 and an opposite suction side shell 124 extending along a longitudinal direction 120 (also main extension direction). The rotor blade 110 is essentially hollow inside.

In the rotor blade root area 114 a rotor blade root end 126 with a flange connection 128 is provided, via which the rotor blade 110 can be mechanically connected to a pitch bearing or an extender. The rotor blade 110 can be a segmented rotor blade.

FIG. 3 shows a schematic cross-section profile 138 (see FIG. 2) of the wind turbine rotor blade 110 running traverse to the longitudinal direction 120. The rotor blade 110 has a shell 130 including two half-shells 132, wherein one half-shell 132 corresponds to the pressure side 122 and the other one to the suction side 124. The two half-shells 132 are firmly connected to each other along the longitudinal axis at opposite connecting surfaces 134. Each half-shell 132 may have a spar cap 136 embedded in the shell-structure. A spar cap 136 can also be generally named "main laminate" and carries main loads during operation of the rotor blade 110. The rotor blade 110 further includes at least one shear web 140 connecting the spar caps 136.

Figure 11:
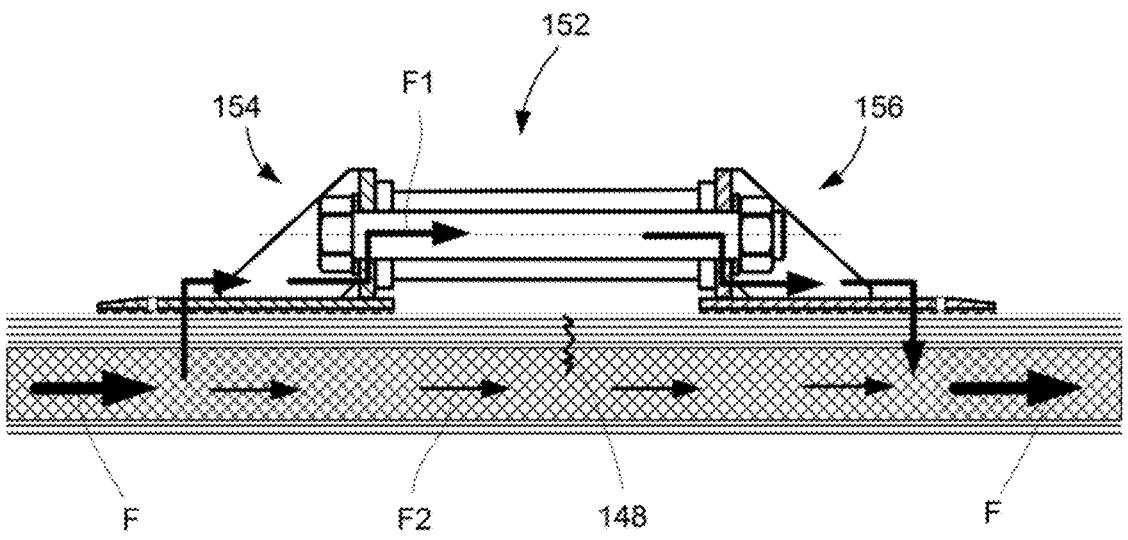
Figure 12:
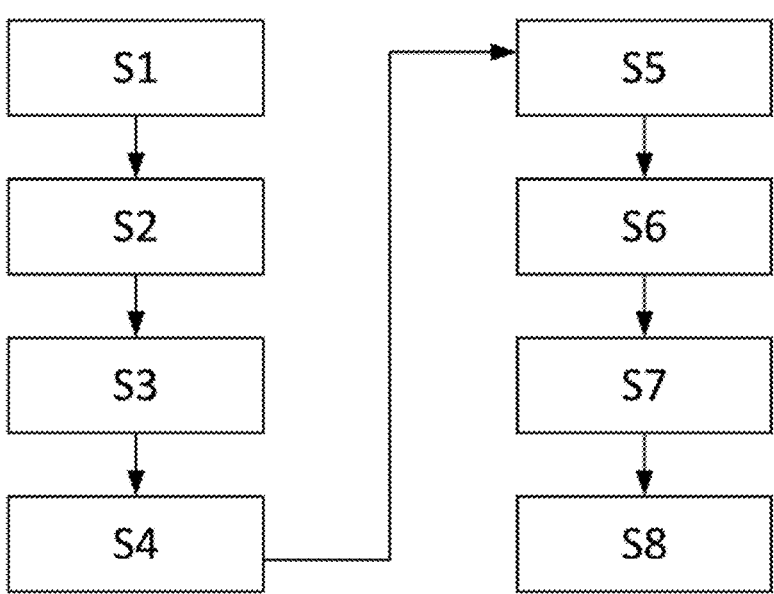

In the following, a method for repairing the shell 130 of the wind turbine rotor blade 110 according to an embodiment of the disclosure is described with the aid of FIGS. 4 to 12, wherein FIG. 12 shows a schematic flow diagram of the method. The shell 130 represents a component made of a fiber reinforced laminate.

Figures 4, 5:
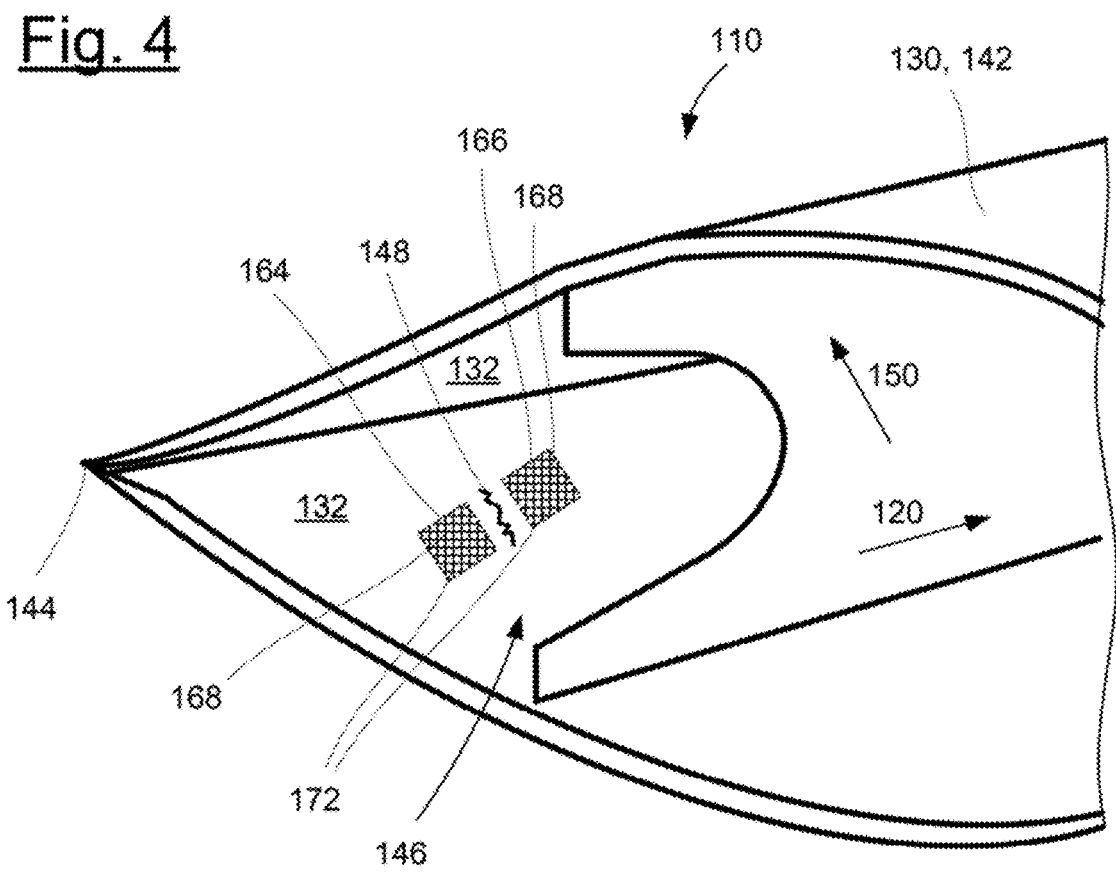
FIG. 4 shows a schematic view of a component of the wind turbine rotor blade.
FIG. 5 shows a schematic side view of the component having a defect.

FIG. 4 shows a schematic side view of a cross section of the wind turbine rotor blade 110, being made of fiber composite laminate. In the example shown, the component 142 is the shell 130, wherein a portion thereof is shown. In the example, the two half-shells 132 are illustrated, which are connected at the trailing edge 144.

On the inside 146 of the rotor blade 110, the component 142 has a defect 148. In the example the defect 148 is a crack and essentially extends along a defect extension direction 150. The defect extension direction 150 runs traverse (not limited thereto) to the longitudinal direction 120.

FIG. 5 shows a schematic cross-sectional side view of the component 142 including the defect 148. Indicated by the arrows, a flow of force F runs through the component 142 and thus through the defect 148. The force F is representative of static and dynamic loads that act on the component 142, for example, during operation of the wind turbine 100. Without any repair action, the acting loads would impact the defect 148, potentially lead to a growth of the defect 148 and might finally lead to a complete failure of the wind turbine rotor blade 110, for example, a breakage of the shell 130.

Figures 6, 7:
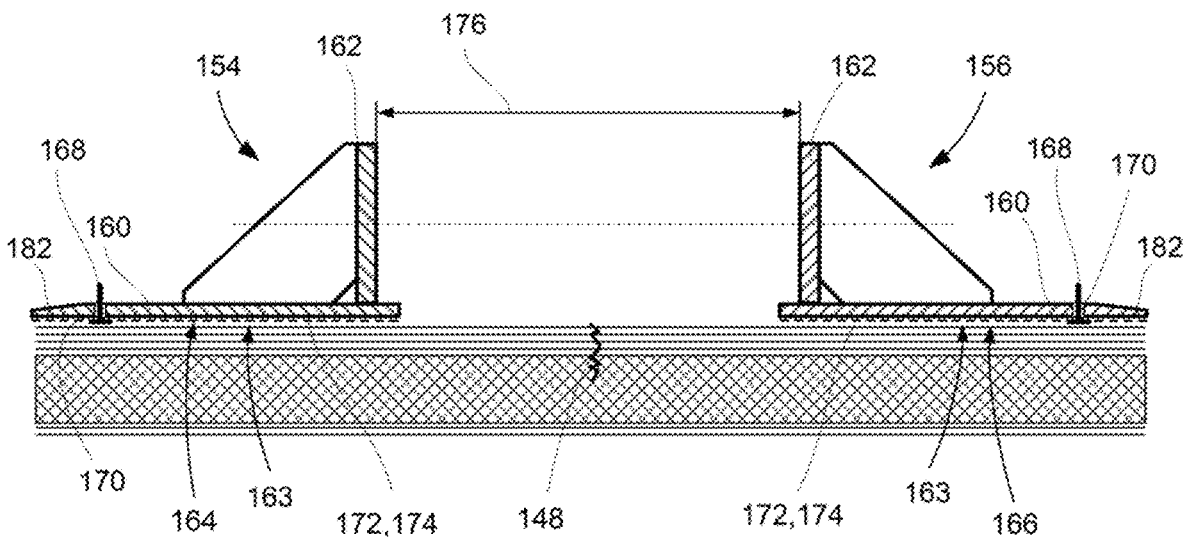
FIGS. 6 to 8 show different views of a repair kit.
Figure 8:
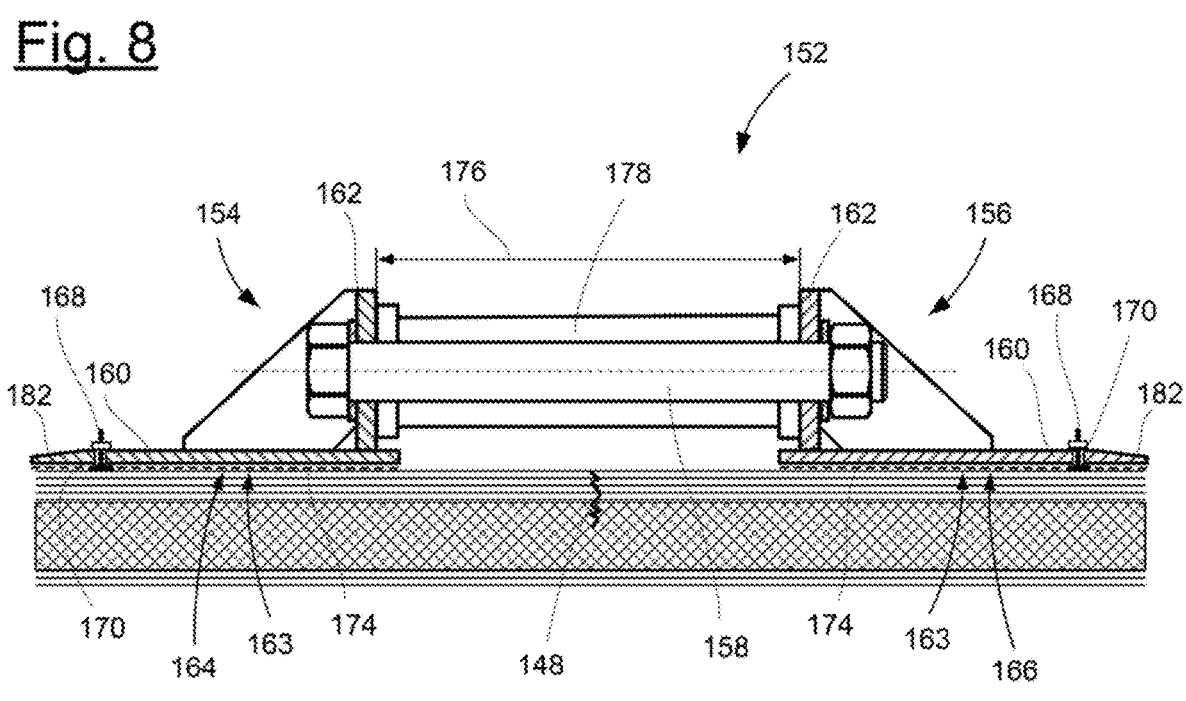

In order to repair the defect 148, the following steps of a method according to an embodiment of the disclosure are performed:

Step S1:

With regard to FIGS. 6 to 8, a repair kit 152 for bridging the defect 148 is provided. As shown in FIG. 6, the kit 152 has a first flange piece 154, a second flange piece 156, and a connecting bolt 158. Each flange piece 154, 156 has a mounting plate 160 and a connecting plate 162 (flange plate). Each mounting plate 160 defines a mounting portion and is to be connected to the component 142. Each connecting plate 162 defines a connecting portion for connecting the flange pieces 154, 156 together via the connecting bolt 158. Essentially, each connecting plate 162 is arranged orthogonal with respect to the respective mounting plate 160. Each mounting plate 160 has a thickness 180 decreasing towards at least an edge 182. Of course, other configurations are possible.

The first flange piece 154 is configured to be bonded onto a respective first surface region 164 of the component 142 (see FIG. 4). The second flange piece 156 is configured to be bonded onto a respective second surface region 166 of the component 142 (see FIG. 4). The two surface regions 164, 166 are located opposite each other on two different sides of the defect 148. The two surface regions 164, 166 define a bonding area on the inner side of the shell 130 (or 132 respectively).

Step S2:

Next, both surface regions 164, 166 are pre-treated. Particularly, the surface regions 164, 166 are cleaned and optionally roughened, which contributes to an efficient bonding.

Step S3:

With regard to FIG. 7, before the flange pieces 154, 156 are bonded to their respective positions on the component 142, their positions are marked. In this regard, one or more studs 168, i.g. big head bonding studs, are fixed on each surface region 164, 166, for example, by gluing it thereto. The studs 168 extend vertically from the surface regions 164, 166. The mounting plates 160 of the flange pieces 154, 156 have corresponding openings 170 into which the studs 168 can be inserted for form-fit engagement.

Step S4:

With regard to FIG. 7, adhesive 172 is applied to both surface regions 164, 166 for bonding the mounting plates 160 of the flange pieces 154, 156 to the respective surface regions 164, 166.

Adhesive 172 is also applied to the mounting plates 160 of the flange pieces 154, 156 (in particular onto the bottom side 163 facing the component 142) for bonding them to the respective surface regions 164, 166 later.

Step S5:

With regard to FIG. 7, a fiber composite laminate pad 174 is applied to the mounting plate 160 of each of the two flange pieces 154, 156 (onto bottom side 163). This step can already be executed in an earlier stage of the method, preferably in a workshop during the manufacturing of the flange pieces 154, 156.

Step S6:

The first flange piece 154 is bonded with its mounting plate 160 onto the first surface region 164 of the component 142. Further, the second flange piece 156 is bonded with its mounting plate 160 onto the second surface region 166 of the component 142. To provide a predetermined pressure on the mounting plates 160 during the curing of the adhesive 172, the studs 168 are applied with nuts. (see FIG. 8) In some cases, heat is applied for curing the adhesive 172. (see FIG. 10)

Figure 9:
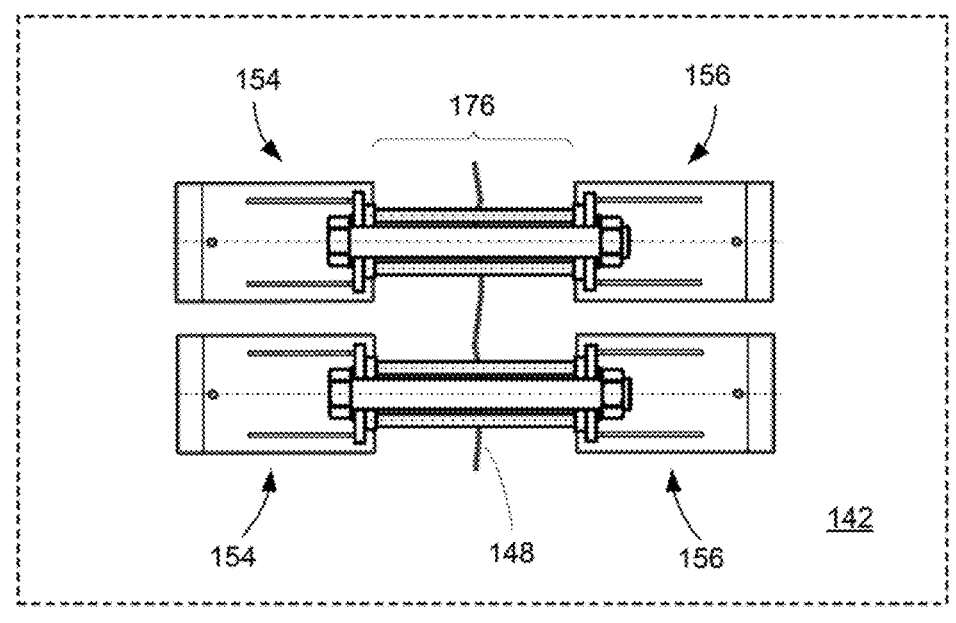
FIG. 9 shows a top view of the component with two repair kits.
Figure 10:
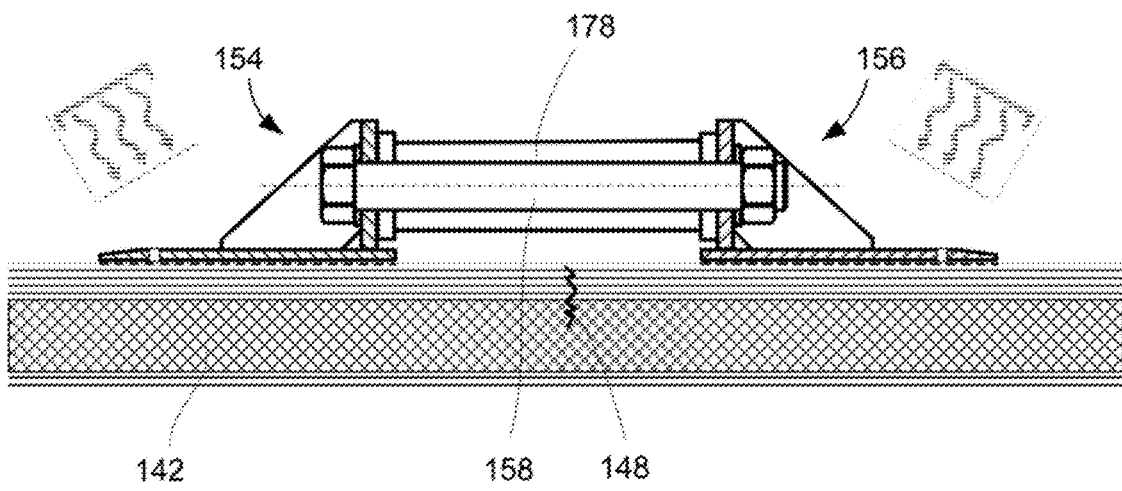
FIGS. 10 and 11 show schematic side views of the component with the repair kits; and, FIG. 12 shows a schematic flow chart of a method for repairing a rotor blade shell according to an embodiment of the disclosure.

Both flange pieces 154, 156 are bonded such that each flange piece 154, 156 is arranged at a predefined distance 176 from the defect 148 such that the defect 148 runs between the two flange pieces 154, 156. In this regard, reference is made to FIG. 9, schematically indicating the bonded state of the flange pieces 154, 156. As can be seen, a further repair kit 152, and thus a further pair of flange pieces 154, 156, is provided, as indicated in the introductory portion of this writing. Generally, depending on the size of the defect 148, one or more repair kits 152 are provided, wherein here and in the following the description is based on one repair kit 152.

Step S7:

With regard to FIG. 8, next, after the adhesive 172 is cured, the first flange piece 154 and the second flange piece 156 are screwed together at their connecting plates 162 via the connecting bolt 158. Thereby, a rigid spacer element 178 is provided between the connecting plates 162 of the flange pieces 154, 156 to ensure the predetermined distance 176 between the connecting plates 162 of the two flange pieces 154, 156. Here, the rigid spacer element 178 is clamped between the connecting plates 162 of the two flange pieces 154, 156 and the connecting bolt 158 is pretensioned.

Step S8:

Now, the defect 148 is structurally bridged, as can be exemplarily seen in FIG. 11. This means that if a force F is acting in/on the component 142 as described above with regard to FIG. 5, the repair kit 152 provides for a load bypass wherein all, or at least an essential portion, of the force F is transferred via the repair kit 152. In FIG. 11, a first portion F1 is transferred via the repair kit 152 to bridge the defect 148, while only a second portion F2 may act on the defect 148.

Optional, a thickness 180 of the mounting plate 160 of each flange piece 154, 156 decreases towards at least an edge 182 of the respective mounting plate 160. In the example shown of FIGS. 6 to 8, each edge 182 is facing away from the connecting plate 162 of the respective flange piece 154, 156. This optimizes load transitions between the flange pieces 154, 156 and the component 142.

It is understood that the foregoing description is that of the preferred embodiments of the invention and that various changes and modifications may be made thereto without departing from the spirit and scope of the invention as defined in the appended claims.

REFERENCE SIGNS 100 wind turbine
102 tower
104 foundation
106 nacelle
108 rotor
110 rotor blade
112 rotor hub
114 rotor blade root region
116 transition region
118 profile region
120 longitudinal direction
122 pressure side shell
124 suction side shell
126 rotor blade root end
128 flange connection
130 shell
132 half-shell
134 connecting surface
136 spar cap
138 cross-section profile
140 shear web
142 component
144 trailing edge
146 inside
148 defect
150 defect extension direction
152 repair kit
154 first flange piece
156 second flange piece
158 connecting bolt
160 mounting plate
162 connecting plate
163 bottom side
164 first surface region
166 second surface region
168 stud
170 opening
172 adhesive
174 fiber composite laminate pad
176 distance
178 spacer element
180 thickness
182 edge
F force
F1 first portion of force
F2 second portion of force

The invention claimed is:

1. A method for repairing a wind turbine rotor blade, the wind turbine rotor blade including a component made of a fiber reinforced laminate, wherein the component includes a defect, the method comprising:

providing a repair kit for bridging the defect, the repair kit having a first flange piece, a second flange piece, and a connecting bolt, wherein the first flange piece and the second flange piece each have a mounting portion and a connecting portion;

bonding the first flange piece with its mounting portion onto a first surface region of the component and bonding the second flange piece with its mounting portion onto a second surface region of the component such that the first flange piece and the second flange piece are each arranged at a predefined distance from the defect and the defect runs between the first flange piece and the second flange piece;

screwing the first flange piece and the second flange piece together at the corresponding connecting portions via the connecting bolt to bridge the defect outside of the component made of the fiber reinforced laminate; and, wherein each of said mounting portions is formed by a mounting plate and each of the connecting portions is formed by a connecting plate arranged orthogonally with respect to the respective mounting plate.

2. The method of claim 1, wherein both the first surface region and the second surface region are pre-treated prior to said bonding.

3. The method of claim 1 further comprising applying adhesive to the mounting portion of the first flange piece and the mounting portion of the second flange piece prior to said bonding for bonding them to corresponding ones of the first surface region and the second surface region.

4. The method of claim 3 further comprising applying heat for curing the adhesive.

5. The method of claim 1 further comprising applying adhesive applied to both the first surface region and the second surface region for bonding the mounting portion of the first flange piece and the mounting portion of the second flange piece to corresponding ones of the first surface region and the second surface region.

6. The method of claim 1 further comprising marking a position of the first flange piece on the component and marking a position of the second flange piece on the component prior to said bonding.

7. The method of claim 6 further comprising fixing a stud on the component for each of the first surface region and the second surface region for at least one of the marking the positions and applying pressure during curing of adhesive, and wherein the mounting portion of each of the first flange piece and the second flange piece has an opening or recess to engage the respective stud in a form-fit manner.

8. The method of claim 1 further comprising applying a fiber composite laminate pad to the mounting portion of each of the first flange piece and the second flange piece, wherein the mounting portion of each of the first flange piece and the second flange piece is bonded to corresponding ones of the first surface region and the second surface region via a corresponding one of the fiber composite laminate pads.

9. The method of claim 1, wherein between the connecting portions of the flange pieces a rigid spacer element is provided to ensure a predetermined distance between the connecting portions of the first flange piece and the second flange piece.

10. The method of claim 9, wherein, via said screwing, the rigid spacer element is clamped between the connecting portions of the first flange piece and the second flange piece such that the connecting bolt is pretensioned.

11. The method of claim 1, wherein a thickness of each of the first flange piece and the second flange piece including the mounting portion decreases towards at least an edge of corresponding ones of the mounting portions.

12. The method of claim 1, wherein the first flange piece and the second flange piece are a metal component or a fiber composite component.

13. A repair kit for a wind turbine rotor blade including a component made of a fiber reinforced laminate, wherein the repair kit is configured for bridging a defect located in the component, the repair kit comprising:

a first flange piece having a first mounting portion and a first connecting portion;

a second flange piece having a second mounting portion and a second connecting portion;

a connecting bolt;

said first flange piece being configured to be bonded onto a first surface region of the component via said first mounting portion and said second flange piece being configured to be bonded onto a second surface region of the component via said second mounting portion such that said first flange piece and said second flange piece are each arranged at a predefined distance from the defect and the defect runs between said first flange piece and said second flange piece;

said connecting bolt being configured to screw said first flange piece and said second flange piece together at said first connecting portion and said second connecting portion to bridge the defect outside of the component made of the fiber reinforced laminate, wherein each of said first mounting portion and said second mounting portion is formed by a mounting plate;

said first connecting portion and said second connecting portion are formed by a connecting plate arranged orthogonally with respect to the respective mounting plate.

14. The repair kit of claim 13 further comprising:

a first fiber composite laminate pad configured to be applied to said first mounting portion of said first flange piece;

a second fiber composite laminate pad configured to be applied to said second mounting portion of said second flange piece;

said first mounting portion being configured to be bonded to the first surface region via said first fiber composite laminate pad; and, said second mounting portion being configured to be bonded to the second first surface region via said second fiber composite laminate pad.

15. The repair kit of claim 13 further comprising a rigid spacer element configured to be arranged between said first connecting portion and said second connecting portion to ensure a predetermined distance between said first connecting portion of said first flange piece and said second connecting portion of said second flange piece.

16. The repair kit of claim 15, wherein said rigid spacer element is configured to be clamped between said first connecting portion of said first flange piece and said second connecting portion of said second flange piece via screwing such that said connecting bolt is pretensioned.

17. The repair kit of claim 13, wherein a first thickness of said first flange piece including said first mounting portion decreases towards at least an edge of the first mounting portion; and, a second thickness of said second flange piece including said second mounting portion decreases towards at least an edge of said second mounting portion.

18. A wind turbine rotor blade comprising:

a component made of a fiber reinforced laminate;

a repair kit for bridging a defect in the component;

said repair kit including a first flange piece having a first mounting portion and a first connecting portion and said repair kit further including a second flange piece having a second mounting portion and a second connecting portion;

said repair kit further including a connecting bolt;

said first flange piece being configured to be bonded onto a first surface region of the component via said first mounting portion and said second flange piece being configured to be bonded onto a second surface region of the component via said second mounting portion such that said first flange piece and said second flange piece are each arranged at a predefined distance from the defect and the defect runs between said first flange piece and said second flange piece;

said connecting bolt being configured to screw said first flange piece and said second flange piece together at said first connecting portion and said second connecting portion to bridge the defect outside of the component made of the fiber reinforced laminate;

wherein each of said first mounting portion and said second mounting portion is formed by a mounting plate; and, said first connecting portion and said second connecting portion are formed by a connecting plate arranged orthogonally with respect to the respective mounting plate.

* * * * *